(12) United States Patent
Frey

(10) Patent No.: US 10,220,663 B2
(45) Date of Patent: Mar. 5, 2019

(54) RUNNING GEAR STRUCTURE FOR A COMMERCIAL VEHICLE AND COMMERCIAL VEHICLE RUNNING GEAR

(71) Applicant: Hochschule für angewandte Wissenschaft und Kunst Hildesheim/Holzminden/Goettingen, Hildesheim (DE)

(72) Inventor: Christopher Frey, Kassel (DE)

(73) Assignee: HOCHSCHULE FUR ANGEWANDTE WISSENSCHAFT UND KUNST HILDESHEIM/HOLZMINDEN/ GOETTINGEN, Hildesheim (DE)

( * ) Notice: Subject to any disclaimer, the term of this patent is extended or adjusted under 35 U.S.C. 154(b) by 57 days.

(21) Appl. No.: 15/617,549

(22) Filed: Jun. 8, 2017

(65) Prior Publication Data

US 2017/0361671 A1  Dec. 21, 2017

(30) Foreign Application Priority Data

Jun. 16, 2016  (DE) .................. 10 2016 007 367
Sep. 27, 2016  (EP) ..................... 16190901

(51) Int. Cl.
  *B60G 9/00* (2006.01)
  *B60G 11/27* (2006.01)
  (Continued)

(52) U.S. Cl.
  CPC ............ *B60G 9/00* (2013.01); *B60B 27/0047* (2013.01); *B60B 35/12* (2013.01); *B60G 7/001* (2013.01);
  (Continued)

(58) Field of Classification Search
  CPC . B60G 9/02; B60G 9/00; B60G 9/003; B60G 21/05; B60G 21/051; B60G 7/02
  See application file for complete search history.

(56) References Cited

U.S. PATENT DOCUMENTS 2,367,817 A * 1/1945 Brown ............... B60G 7/00
                                                      180/352
3,777,838 A * 12/1973 Barnes ............... B60G 3/02
                                                      180/352
(Continued)

FOREIGN PATENT DOCUMENTS

DE  195 21 874 A1  12/1996
DE  101 10 495 B4  5/2010
(Continued)

OTHER PUBLICATIONS

European Search Repori in co-pending, related EP Application No. EP 16 19 0901, dated Jul. 3, 2017.

*Primary Examiner* — Nicole T Verley
(74) *Attorney, Agent, or Firm* — Thomas | Horstemeyer, LLP

(57) ABSTRACT

The invention relates to a running gear structure (4) for a commercial vehicle. The running gear structure comprises a lower transverse strut (8) and an upper transverse strut (9). The lower transverse strut (8) and said upper transverse strut (9) are fixedly connected to each other. The upper transverse strut (9) comprising two recesses (12, 13) which limit a space (14) located above the lower transverse strut (8). The space (14) is open at least in upper direction and dimensioned for accommodating a suspension spring (6). Preferably, an axle body and longitudinal swinging arms (22, 23) of the running gear structure (4) have a skeletal design with a plurality of struts (5). It is possible that the running gear structure (4) is L-shaped in a side view. Here, one leg of the L is formed by a horizontal structure part forming the (Continued)

longitudinal swinging arms (22, 23) whereas the other leg of the L is formed by a vertical structure part forming the axle body.

20 Claims, 12 Drawing Sheets

(51) Int. Cl.
*B60B 27/00* (2006.01)
*B60B 35/12* (2006.01)
*B60G 7/00* (2006.01)
*B60G 11/26* (2006.01)
*B60K 7/00* (2006.01)
*B60G 11/28* (2006.01)

(52) U.S. Cl.
CPC ............. *B60G 9/003* (2013.01); *B60G 11/26* (2013.01); *B60G 11/27* (2013.01); *B60G 11/28* (2013.01); *B60K 7/0007* (2013.01); *B60G 2200/31* (2013.01); *B60G 2202/152* (2013.01); *B60G 2204/126* (2013.01); *B60G 2206/014* (2013.01); *B60G 2206/124* (2013.01); *B60G 2206/30* (2013.01); *B60G 2206/31* (2013.01); *B60G 2206/7101* (2013.01); *B60G 2206/8201* (2013.01)

(56) References Cited

U.S. PATENT DOCUMENTS

| | | | | |
|---|---|---|---|---|
| 4,009,873 A * | 3/1977 | Sweet | ................. | B60G 11/465 267/256 |
| 4,029,338 A * | 6/1977 | Headley | ................. | B60G 9/00 267/248 |
| 4,057,120 A * | 11/1977 | Roethlisberger | ......... | B60G 3/24 180/233 |
| 4,334,696 A * | 6/1982 | Bergstrom | ................. | B60G 9/00 280/124.104 |
| 5,409,254 A * | 4/1995 | Minor | .................... | B60G 9/003 267/190 |
| 5,690,353 A | 11/1997 | Vandenberg | | |
| 5,778,798 A * | 7/1998 | VanDenberg | .......... | B60G 7/001 105/215.2 |
| 6,129,367 A | 10/2000 | Bublies | | |
| 6,152,468 A * | 11/2000 | Glaser | .................. | B60G 21/051 280/124.134 |
| 6,749,209 B2 * | 6/2004 | Davison | .................. | B60B 35/08 280/124.109 |
| 7,464,948 B2 * | 12/2008 | Ramsey | ................. | B60G 7/001 280/124.107 |
| 7,721,832 B2 * | 5/2010 | Fischer | .................... | B60G 9/02 180/9.5 |
| 7,748,726 B2 * | 7/2010 | Dudding | ................ | B60G 7/001 280/124.116 |
| 7,926,846 B2 * | 4/2011 | Tanaka | .................... | B60G 3/20 280/781 |
| 8,579,308 B2 * | 11/2013 | Weeks | ..................... | B60G 7/02 280/124.109 |
| 8,720,920 B2 * | 5/2014 | Williams | ............... | B21D 19/08 16/2.2 |
| 9,421,987 B2 * | 8/2016 | Becher | ...................... | B61F 5/52 |
| 2003/0025879 A1 | 11/2003 | Davison et al. | | |
| 2006/0181047 A1 | 8/2006 | Chamberlin | | |
| 2007/0069496 A1 * | 3/2007 | Rinehart | ................ | B21D 53/88 280/124.166 |
| 2007/0145705 A1 | 6/2007 | Ramsey | | |
| 2009/0250895 A1 * | 10/2009 | Smith | ...................... | B60G 3/14 280/124.125 |
| 2011/0057408 A1 * | 3/2011 | Koschinat | ............... | B60B 35/08 280/124.11 |

FOREIGN PATENT DOCUMENTS

| | | | | |
|---|---|---|---|---|
| DE | 10 2009 024 831 A1 | 12/2010 | | |
| DE | 197 81 757 B4 | 3/2011 | | |
| DE | 10 2012 106 152 A1 | 1/2014 | | |
| DE | 10 2013 214 673 A1 | 1/2015 | | |
| DE | 102014202831 A1 * | 8/2015 | ........... | B60G 13/005 |
| DE | 10 2014 011 803 A1 | 2/2016 | | |
| DE | 10 2015 202 085 A1 | 8/2016 | | |
| EP | 0 940 319 D1 | 2/1999 | | |
| EP | 1118528 A3 * | 12/2002 | ............. | B62D 25/00 |
| EP | 1 572 476 B1 | 9/2005 | | |
| EP | 2 567 838 A2 | 3/2013 | | |
| GB | 2 355 698 A | 5/2001 | | |
| WO | 2005/037579 A2 | 4/2005 | | |
| WO | 2014/009320 A1 | 1/2014 | | |
| WO | WO-2017076563 A1 * | 5/2017 | ............. | B60G 9/003 |

* cited by examiner

RUNNING GEAR STRUCTURE FOR A COMMERCIAL VEHICLE AND COMMERCIAL VEHICLE RUNNING GEAR

CROSS REFERENCE TO RELATED APPLICATIONS

This application claims priority to co-pending German Patent Application No. DE 10 2016 007 367.5 filed Jun. 16, 2016 and co-pending European Patent Application EP 16 190 901.5 filed Sep. 27, 2016.

FIELD OF THE INVENTION

The invention relates to a commercial vehicle running gear and a running gear structure for a commercial vehicle. The commercial vehicle running gear and the running gear structure are preferably used in a commercial vehicle where the commercial vehicle might e.g. be
- a commercial vehicle for the transportation of human beings as a bus,
- a commercial vehicle for the transportation of loads as a transporter, truck, van, lorry, freight vehicle or heavy-goods vehicle (e.g. car transporter, semi-trailer or tractor-trailer or articulated vehicle, towing vehicle, motor tractor or tractor truck, fueling vehicle or trailer),
- a commercial vehicle for emergency crews,
- an agricultural vehicle as a combine or an agricultural tractor or
- any other commercial vehicle as a dumptruck, a road sweeping vehicle, a snow groomer and the like (to mention only some non-limiting examples). Preferably, the invention is used for a rigid running gear or axle body of a commercial vehicle. Rigid running gears or axle bodies of this type are e.g. used for non-driven axles in load carrying vehicles as so-called leading axle or pushing axle or trailing axle and their trailers.

In a commercial vehicle running gear a running gear structure of the present type in particular serves for
- the support of the vehicle wheels for being rotated,
- the resilient and/or dampened support of the vehicle wheels at the vehicle chassis,
- the coupling of the resilient displacements of the vehicle wheels at the right and left side of the vehicle,
- the support of a brake device for the vehicle wheels and/or
- the support of dynamical wheel vertical support forces, lateral guide forces, accelerating forces, brake forces from the vehicle wheels and the support and/or (in some cases resilient and/or dampened) and the transmission of these forces to the vehicle chassis.

BACKGROUND OF THE INVENTION

The patent publication DE 101 10 495 B4 describes a common commercial vehicle running gear. The axle body extending in transverse direction of the vehicle consists of a hollow profiled bar having a rectangular cross section. In its end regions the profiled bar is connected to stub axles serving for a rotatable support of the vehicle wheels. Two longitudinal swinging arms extending in longitudinal direction of the vehicle are screwed to the lateral ends of the axle body. In the front region, the longitudinal swinging arms are supported by rotational joints at holding consoles mounted to the vehicle chassis. First spring bases of suspension springs formed by air suspension bellows are mounted to the rear ends of the longitudinal swinging arms. The other spring legs of the air suspension bellows are supported by the vehicle chassis. Furthermore, shock absorbers are arranged on both sides between the longitudinal swinging arms and the vehicle chassis. According to DE 101 10 495 B4, the end region of the longitudinal swinging arm facing away from the rotational joint (where the first spring base of the air suspension bellow is supported) is cranked in lower direction. In this way, it is possible that the supporting location of the spring base of the air suspension bellow can be positioned in a lower position relative to the stub axle which leads to a compact design.

Further embodiments of commercial vehicle running gears with an axle body and longitudinal swinging arms are in particular known from the publications EP 1 572 476 B1, DE 197 81 757 B4 (corresponding to U.S. Pat. No. 5,690, 353 A), EP 2 567 838 A2, DE 10 2014 011 803 A1 and EP 0 940 319 B1.

WO 2005/037579 A2 discloses a flexible axle body which is fixedly screwed to a vehicle frame. Here, the axle body comprises a longitudinal sectional shape which corresponds to a lying U which extends in a vertical plane. The upper side leg of the U is fixedly screwed to the vehicle frame. The rounded base leg of the U forms a flexible suspension region. The other side leg of the U is slightly inclined in downward direction and comprises an upper cover plate as well as a lower cover plate. Stiffening plates extend between the cover plates. In the end region of the lower side leg which faces away from the base leg, the axles are supported. An air suspension bellow is interposed between the vehicle frame and the upper cover plate of the lower side leg of the U. An elastic displacement of the axles requires a bias of the air suspension bellows as well as an elastic deformation of the flexible base leg of the U. WO 2005/037579 A2 discloses both a continuous axle body designated for both vehicle sides as well as an axle body designated only for one vehicle side which in this case forms a kind of swinging longitudinal arm. For another embodiment known from WO 2005/037579 A2, the axle body does not comprise a shape which corresponds to an U in the longitudinal section but instead a shape which corresponds to a stretched Z in the longitudinal section. In this case, the upper horizontal leg of the Z is screwed to the vehicle frame whereas the axles are supported by the lower horizontal leg of the Z. In this case, the air suspension bellow is supported on the upper side of the lower horizontal leg of the Z. The flexible part is here formed by the transitional region from the upper horizontal leg of the Z to the inclined connecting region of the Z.

A generally corresponding embodiment is also known from US 2007/0145705 A1.

US 2006/0181047 A1 discloses the formation of a longitudinal swinging arm from welded metal sheets which form a partially open box-like cross section. The longitudinal swinging arms designed in this way are mounted by saddle brackets to a conventional axle body having a cylindrical geometry.

DE 10 2009 024 831 A1 discloses a compound crank rear axle wherein a longitudinal swinging arm has a box-like design with a cross section enlarging towards a transverse support. The longitudinal swinging arm is mounted to the transverse support by knot elements which couple a rear end region of the longitudinal swinging arm to the transverse support. Additionally, two wheel supports are provided at the knot elements. Also the knot elements are formed by box-like hollow bodies.

DE 10 2013 214 673 A1 discloses a longitudinal swinging arm, a transverse swinging arm or a diagonal swinging arm which is manufactured from a fiber-reinforced thermoplastic material by injection molding or injection pressing. Here, reinforcing fibers embodied as carbon fibers, glass fibers or aramid fibers are used. Arms manufactured in this way comprise in a longitudinal sectional view a continuous circumferential web which is stiffened by stiffening ribs similar to a framework.

DE 195 21 874 A1 (corresponding to U.S. Pat. No. 6,129,367 A) discloses an axle support for a rigid axle of a vehicle. Here, a four-point arm is used which comprises a two-dimensional support. The support is elastic so that a twisting of the support is possible with a relative movement of the arms resulting therefrom. The four-point arms allow pendulum movements of the vehicle axle relative to the vehicle frame directed transverse to the driving direction. A twisting of the support resulting therefrom causes return forces for reestablishing an equilibrium position of the arms.

DE 10 2015 202 085 A1 relates to a structure component which is e.g. a triangular transverse arm, a transverse arm or a compound crank rear axle. The component of the structure is a hybrid construction with one component made of metal and a reinforcing component made of a fiber-reinforced plastic material. The structure component on the one hand and the reinforcing component on the other hand comprise geometries which (in a first approximation) correspond to each other. The components are arranged in a sandwich-like configuration and connected to each other by coating or insert molding, bonding, screwing, riveting, clipsing, curling, injection-molding through the parts and the like.

SUMMARY OF THE INVENTION

One object of the present invention is to suggest a commercial vehicle running gear and a running gear structure for a commercial vehicle which is in particular improved with respect to
the weight,
the elastic suspension characteristics,
the mechanical strength, durability and/or stiffness and/or constructional space requirements.

One embodiment of the invention proposes that a running gear structure comprises a lower transverse strut and an upper transverse strut which are fixedly connected to each other in particular for forming a kind of axle body. The upper transverse strut comprises two recesses. It is generally possible that the cross sections of theses recesses have an open edge. However, preferably the recesses have a cross section with a closed edge. The recesses are here in particular located in regions close to the wheel suspension locations. By the recesses a space is defined which is arranged above the lower transverse strut. The space is suitable and designated for accommodating a suspension spring so that the space forms a suspension spring accommodation. Accordingly, the recess comprises a cross section such that the suspension spring can extend through the recess. It is possible that with its lower spring base the suspension spring is supported at the lower transverse strut. For this purpose, the lower transverse strut might also comprise a suitable mounting device and/or guiding device for the lower spring base of the suspension spring. An upper spring base which extends in upward direction from the space and out of the recess of the upper transverse strut is supported at the vehicle chassis, mounted to the same and/or guided by the same.

According to the prior art, the suspension spring on the one hand and the axle body with the longitudinal swinging arms on the other hand are separated from each other in space which results in an enlarged constructional space. Instead, according to one embodiment of the invention, it is possible to "nest" the suspension spring and the running gear structure into each other which in some cases leads to advantage with respect to the constructional space. Furthermore, by this design the available constructional space available for stiffening measures of the running gear structure is extended because parts of the running gear structure can also extend around the suspension spring. It is also possible that by the recess of the upper transverse strut a protection or a guidance of the suspension spring is provided. Furthermore, it is possible that the vehicle spring does not protrude in upper direction from the upper transverse strut. In this case, a bracket or protrusion of the vehicle chassis might extend through the recess of the upper transverse strut from above to the suspension spring.

For another embodiment of the invention, in the region of the recess the upper transverse strut at least partially (in particular in the region of the whole recess) comprises a distance from the lower transverse strut which is smaller than the longitudinal extension of the suspension spring. In the case of an inclined design of the end regions of the upper transverse strut, the distance might also reduce in lateral direction. Due to this choice of the design of the distance, the suspension spring protrudes at least partially in its upper end region from the upper transverse strut so that here a connection of the same to the vehicle chassis is possible.

Another proposal of the invention addresses the following problem:

The overall height of commercial vehicles is limited by law. In order to provide a maximum for the height of the loading space, the commercial vehicle running gear should be as low as possible—representative is the so-called driving height h. The driving height is defined as the vertical distance of the axle middle line up to the upper edge of the commercial vehicle running gear or the lower edge of the vehicle chassis. In order to make the driving height as low as possible, generally the comparatively long air suspension bellows are usually not mounted directly above the axle body but with a horizontal offset behind the axle body. For this purpose, the longitudinal swinging arms may comprise a cranking (cp. EP 1 572 476 B1 and DE 101 10 495 B4). This design leads to conceptual disadvantages which are caused by the fact that the vertical wheel load is distributed or diverted to two components forming a couple of forces. Here, one component is in an unsuspended way transferred via the rotational joint of the longitudinal swinging arm into the vehicle chassis whereas the other component is transferred by the suspension spring into the vehicle chassis in a suspended fashion. For a common configuration, one-third of the wheel load is transferred in an unsuspended way by the rotational joint of the longitudinal swinging arm. This leads to unsatisfactory suspension characteristics of the vehicle which leads to increased mechanical stresses acting upon the commercial vehicle running gear as well as to a bias of the payload by impacts in an undesired way. Another disadvantage relates to the weight of the commercial vehicle running gear which is influenced in negative way by this design.

In particular on the above background, the invention proposes that the running gear structure comprises wheel support locations. A connecting line of the wheel support locations forms an axis middle line. In a plane view or projection into the horizontal plane this connecting line crosses or intersects the space which is open at least in upper direction and arranged above the lower transverse strut (in particular crosses the recess of the upper transverse strut). Accordingly, for this design the wheel loads are introduced via the wheel suspension locations into the running gear structure approximately at the same longitudinal extension of the longitudinal swinging arms as the location where the longitudinal swinging arms are supported by the suspension spring at the vehicle chassis. In the ideal case wherein the connecting line centrically crosses the space being open in upper direction, this applies exactly at the same longitudinal extension which leads to the result that the wheel load is not supported by a couple of forces with one component in the rotational joint of the longitudinal swinging arms at the vehicle chassis and one component in the suspension spring. Instead, in this case there is only the support by the suspension spring. Also in the not ideal case of a non-centrically crossing of the space which is open in upper direction the undesired component supported by the rotational joint is drastically reduced when compared to the corresponding components for designs according to the prior art. Accordingly, the inventive design reduces the forces which are transferred to the vehicle chassis in an unsuspended fashion. On the other hand, the bias of the longitudinal swinging arms with a bending moment is reduced. Accordingly, in some cases it is possible to change the dimensioning of the longitudinal swinging arm with a reduction of the mass resulting therefrom.

In the case that the recess is arranged with an offset to the connecting line of the wheel suspension locations, the offset is preferably less than 30% (in particular less than 25%, less than 20%, less than 15%, less than 10%, less than 5% or even less than 3%) of the longitudinal extension of the longitudinal swinging arms between the connecting line and the rotational axis of the rotational joint.

For the geometry of the cross section of the recess there are a lot of options. Preferably, the recess comprises (when seen in a top view) a shape without any corners. The recess might e.g. have an elliptical, circular or at least approximately circular shape.

It is generally possible that the running gear structure comprises only one single diagonal strut. However, in a preferred embodiment of the invention the running gear structure comprises two diagonal struts which preferably approximately in the middle connect the two transverse strut with each other. Here, it is possible that the two diagonal struts extend (similar to a V which is open in upper direction) from the lower transverse strut to the upper transverse strut. In the case that the end regions of the upper transverse strut are angled in downward direction, it is possible that the legs of the V merge into the region of the start or the transition of the angled end regions of the upper transverse strut.

For connecting the upper and lower transverse struts in the lateral end regions, there are a lot of options. These can e.g. be directly connected to each other, in particular by welding. For one proposal of the invention, the upper transverse strut and the lower transverse strut are connected to each other in both end regions by a respective connecting piece. Here, the connecting piece comprises a geometry suitable for providing the transfer of forces from the connecting piece to the two transverse struts without stress peaks. On the other hand, the connecting piece might fulfill further functions which are in particular related to the coupling of the running gear structure to the wheel units. The connecting piece might be manufactured in any way, in particular as a milled part, a cast part or a forging part. Preferably, the connecting piece is a component manufactured by solid metal forming.

Furthermore, the invention proposes that a brake flange and/or a stud axle are/is integrated into the connecting piece or with the connecting piece. Here, it is possible that the brake flange and/or the stud axle are integrally formed by the connecting piece. However, it is also possible that the brake flange and/or the stud axle are separate parts which can then be connected to the connecting piece by known connecting techniques. In a preferred embodiment, the brake flange is welded to a base body of the connecting piece whereas the stud axle is pressed into a suitable bore of the brake flange and/or the base body. The stud axle can additionally be welded to the brake flange and/or the base body.

Common constructional units formed with the axle body and the longitudinal swinging arms have a mass which is higher than 145 kg. According to the invention, with the use of the provision of the axle body with the longitudinal swinging arms by the running gear structure it is suggested that a running gear structure which is designated for a technical axle load of at least 7000 kg comprises a mass being lower than 130 kg. Preferably, the mass is lower than 125 kg, lower than 120 kg, lower than 115 kg, lower than 110 kg, lower than 105 kg or even lower than 100 kg (which might also apply if the technical axle load is at least 8000 kg).

One embodiment of the invention bases upon the finding that common commercial vehicle running gears are formed with an axle body and longitudinal swinging arms that form a constructional unit or assembly unit. Here it is possible that the axle body and the longitudinal swinging arms are formed separately from each other and screwed to each other. However, it is also possible that the axle body and the longitudinal swinging arms have a one-piece or integral design. Both the common axle body as well as the longitudinal swinging arms are each formed as a carrier having a solid profile or a hollow profile. Here, in a mechanical series connection the carriers of the axle body and the longitudinal swinging arms are connected to each other in an U-shape (in a rough approximation). The axle body forms the base leg of the U and the longitudinal swinging arms form a side leg of the U each. According to the prior art, the longitudinal swinging arms do not only serve for guiding the axle. Instead, the longitudinal swinging arms also transfer the axle load to the rotational joint between the longitudinal swinging arm and the bracket of the vehicle chassis as well as to the suspension spring. Accordingly, the longitudinal swinging arms are biased by a considerable bending moment. The transfer of the bending moment leads to the result that it is required that the carriers forming the longitudinal swinging arms have a comparatively massive design and have a corresponding high weight (e.g. spring steel 80×40 mm with a rectangular cross section). In the region of the connection between the longitudinal swinging arms and the axle body as well as of the axle body with the stub axle, the axle body is biased by high notch stresses. In order to provide the required strength, it is necessary to use a sufficiently massive carrier which forms the longitudinal swinging arms and the axle body. This leads to an increase of the mass of the axle body and of the guiding arms. Due to the fact that the mass of the axle body and the guiding arms form unsuspended masses of the vehicle, generally minimized masses are intended. The increase of the weight of the commercial vehicle running gear additionally to the same extent leads to a reduction of the payload of the vehicle because the admissible overall weight of the vehicle is limited (by law and due to the technical requirements as the durability of the tires).

On this background, one embodiment of the invention proposes that the axle body and the longitudinal swinging arms are not formed by profiled carriers each which are connected in an U-shape with each other. Instead, the invention proposes the use of a running gear structure. In the running gear structure, the axle body and the longitudinal swinging arms have a skeletal design with a plurality of struts. In a "running gear structure" of this type the single carriers are not connected with each other in a mechanical series connection. Instead, the struts of the support structure have e.g. a frame structure, a framework design, a bifurcated design or a design of a ring so that a plurality of struts define a two-dimensional or even a three-dimensional structure. Accordingly, the invention for the first time proposes the use of a support structure for an axle body and the longitudinal swinging arms of a commercial vehicle running gear so that within the frame of the invention the provision of a high geometrical moment of inertia in a two-dimensional or three-dimensional structure with skeletal, framework-like, bifurcated or ring-shaped struts is used for a running gear of a commercial vehicle. In this way, it is possible to provide the required stiffness with a mass that is drastically reduced when compared to the running gears known from the prior art.

Within the frame of the invention there are a lot of options for the constructive design of the struts. In order to only mention some non-limiting examples, the struts may be formed with a solid profile or a hollow profile having an open edge or a closed edge in the cross section. The struts can comprise any cross section being constant or changing in longitudinal direction of the struts and/or can have a longitudinal axis being straight or curved in a plane or even in the three-dimensional space.

Generally, the running gear structure for the commercial vehicle might have any geometry. Accordingly, the running gear structure can e.g. be flat or two-dimensional or curved in space. For another proposal of the invention, in a side view the running gear structure is L-shaped. Here, the vertical leg of the L forms a vertical structure part which forms the axle body. Instead, a horizontal leg of the L forms a horizontal structure part which forms the longitudinal swinging arms. It is generally possible that the two aforementioned structure parts are screwed to each other or are mounted to each other in another way. However, preferably the two aforementioned structure parts are connected with each other by a material bond or formed integrally or as one single piece. It is also possible that the two structure parts are rigidly coupled with each other by a common transverse strut. This embodiment of the invention bases on the requirement that an L-shaped angled support structure in some cases comprises a further increased stiffness due to the increased geometric moment of inertia. It is also possible that the single structure parts are purposefully adapted to the different loads of the running gear structure.

For one proposal of the invention, the struts comprise a double-T cross section. Accordingly, the struts per se already have a high geometric moment of inertia with a resulting high bending stiffness resulting therefrom. Here, the struts are welded from metal sheets. One metal sheet might form the vertical leg of the double-T, whereas two other metal sheets form the horizontal legs of the double-T. The tailoring of the metal sheets (e.g. with respect to the changing width of the metal sheet; in particular by laser beam cutting) can be provided in dependence on the bias of the cross section. Accordingly, a changing cross section of the struts might result in dependence on the bias of the cross section. On the other hand, by use of a suitable tailoring and a suitable shaping or curvature of the metal sheets, it is possible to define the contour of the longitudinal axis of the strut.

For another embodiment of the invention, the running gear structure for a commercial vehicle comprises a lower transverse strut and an upper transverse strut. The upper transverse strut is arranged above the lower transverse strut. The upper transverse strut is connected to the lower transverse strut by at least one diagonal strut and/or a connecting piece.

The aforementioned transverse struts can e.g. in their end regions each be connected by a connecting piece to each other and additionally between the connecting pieces by at least one diagonal strut so that a supporting structure or a supporting structure part is provided. This support structure or structure part extends e.g. in a vertical plane which has an orientation transverse to the vehicle longitudinal axis and provides e.g. a sufficient bending stiffness for a bending moment which has an orientation around the vehicle longitudinal axis.

As explained before, the struts (in particular the upper and the lower transverse struts) may have any geometry. For one proposal of the invention, the two end regions of the upper transverse strut are angled downwards towards the lower transverse strut. This embodiment bases upon the fact that the bending moment increased from the end regions of the transverse struts towards the middle of the same. Due to the angled design, in a corresponding way the geometric moment of inertia increases towards the center so that the contour of the bending moment is considered by the angled design. On the other hand, due to the angled design in the end regions there is a reduced constructional height of the running gear structure in the lateral side region of the vehicle Accordingly, the running gear structure can best and in a space-saving way be integrated into the vehicle (in particular into the vehicle chassis). In order to mention only some non-limiting examples, the upper transverse strut might have the shape of an inverted V or an inverted U with diverging side legs of the U.

Alternatively or cumulatively it is possible that the running gear structure comprises two longitudinal swinging arms which (with respect to the outer contour in a top view) have a triangular design. Here, it is possible that the longitudinal swinging arms comprise three struts arranged in a triangular configuration (in particular an inner strut and an outer strut and a part of the lower transverse strut). In this way, it is possible to provide a longitudinal swinging arm having the required stiffness due to an increased geometric moment of inertia with at the same time small weight. For this proposal of the invention, also the longitudinal swinging arms form a support structure or structure part which extends approximately in a horizontal plane of the vehicle. The invention transfers this embodiment of a generally known design of a triangular control arm of a passenger car to a running gear structure having a rigid running gear of a commercial vehicle.

Another solution of the object of the present invention is provided by a commercial vehicle running gear comprising a running gear structure as described above. This solution takes benefit from the fact that in the running gear structure open areas or spaces are formed wherein additional parts can be arranged. Accordingly, the additional parts can be integrated into the commercial vehicle running gear in a compact way and can in some cases be protected by struts of the running gear structure which at least partially surround these additional parts.

As explained above, it is possible that in the recesses, here recesses of the upper transverse strut, the suspension springs, in particular air suspension bellows, are arranged.

Alternatively or cumulatively it is possible that in the free areas or spaces of the running gear structure electronics, at least an electric motor (which might be an actuator or a drive motor for a vehicle wheel), a control unit and/or a valve device for manipulating the pneumatic bias of a suspension spring formed by an air suspension bellow and/or a brake actuator are/is arranged.

If within the frame of the present specification a "connection" of parts or constructional elements is mentioned, this might be any type of connection, fixing or mounting. Preferably, the connection of the constructional elements is an adhesive bond, in particular a welding seam. However, the connection might also be provided by an integral design of the connected parts or components.

Advantageous developments of the invention result from the claims, the description and the drawings. The advantages of features and of combinations of a plurality of features mentioned at the beginning of the description only serve as examples and may be used alternatively or cumulatively without the necessity of embodiments according to the invention having to obtain these advantages. Without changing the scope of protection as defined by the enclosed claims, the following applies with respect to the disclosure of the original application and the patent: further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims.

The number of the features mentioned in the claims and in the description is to be understood to cover this exact number and a greater number than the mentioned number without having to explicitly use the adverb "at least". For example, if a strut is mentioned, this is to be understood such that there is exactly one strut or there are two struts or more struts. Additional features may be added to these features, or these features may be the only features of the respective product.

The reference signs contained in the claims are not limiting the extent of the matter protected by the claims. Their sole function is to make the claims easier to understand.

BRIEF DESCRIPTION OF THE DRAWINGS

In the following, the invention is further explained and described with respect to preferred exemplary embodiments illustrated in the drawings.

DETAILED DESCRIPTION

Figure 1:
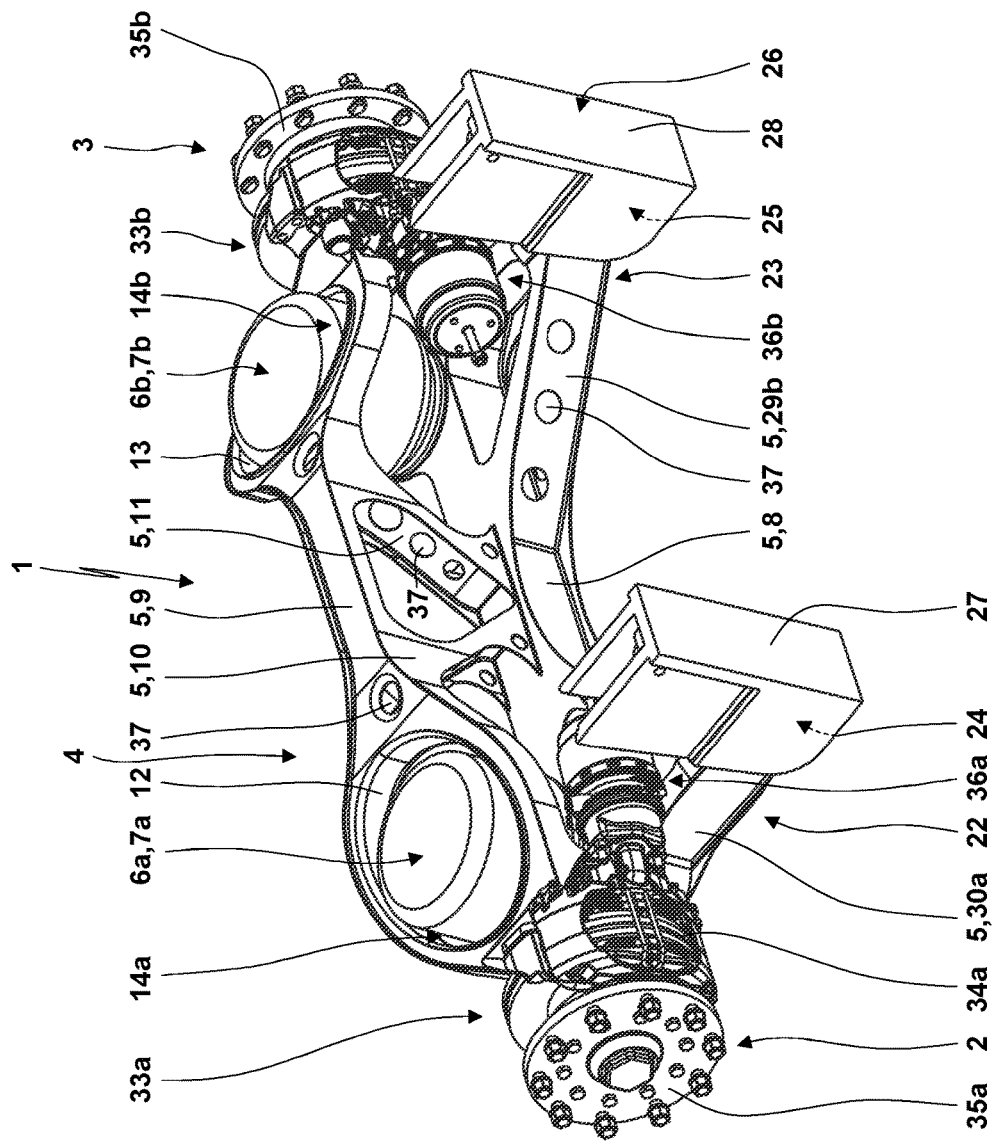
FIG. 1 shows a commercial vehicle running gear in a three-dimensional view taken under an angle from the front, left and above.
Figure 2:
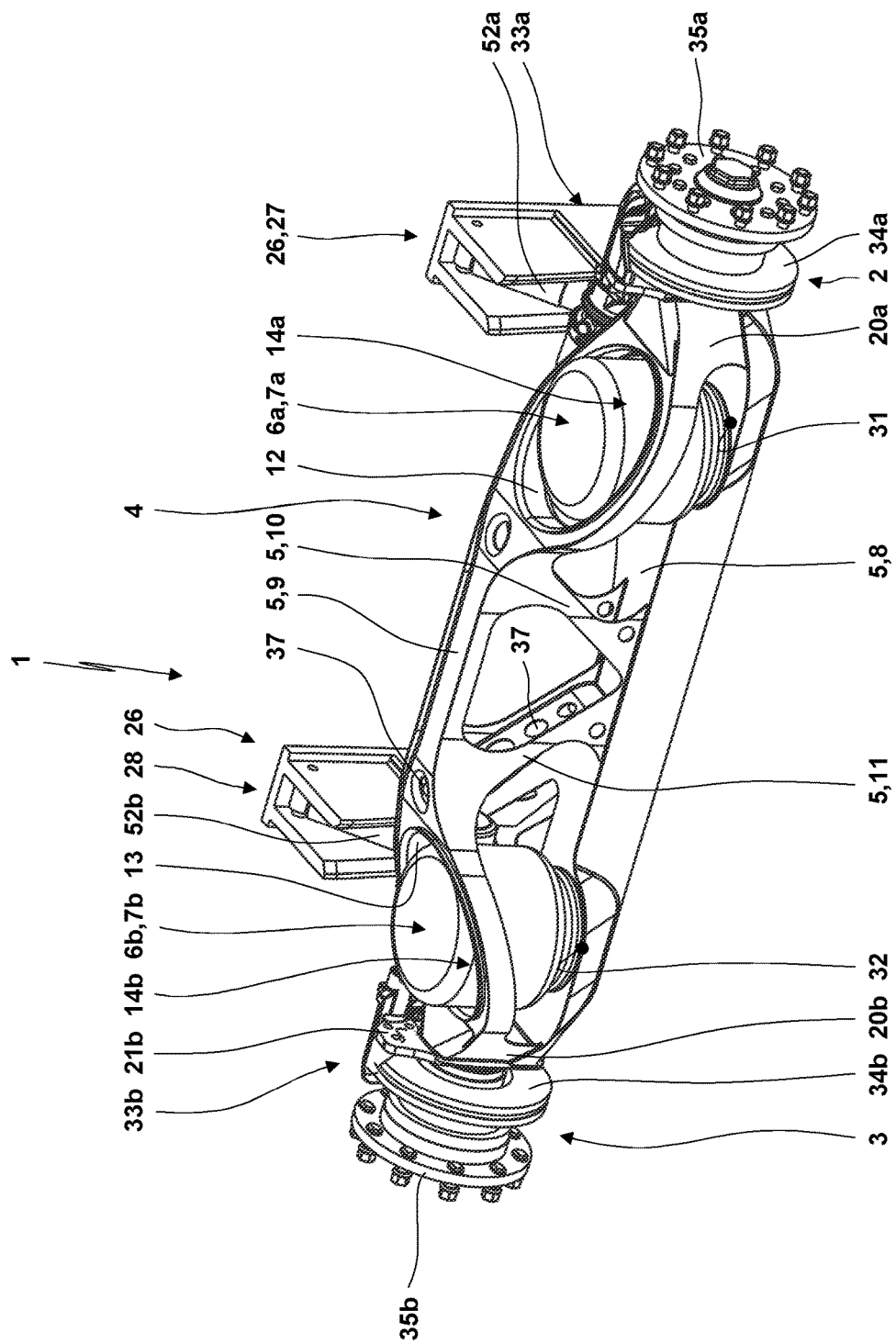
FIG. 2 shows the commercial vehicle running gear according to FIG. 1 in a three-dimensional view taken under an angle from the right, rear and above.
Figure 3:
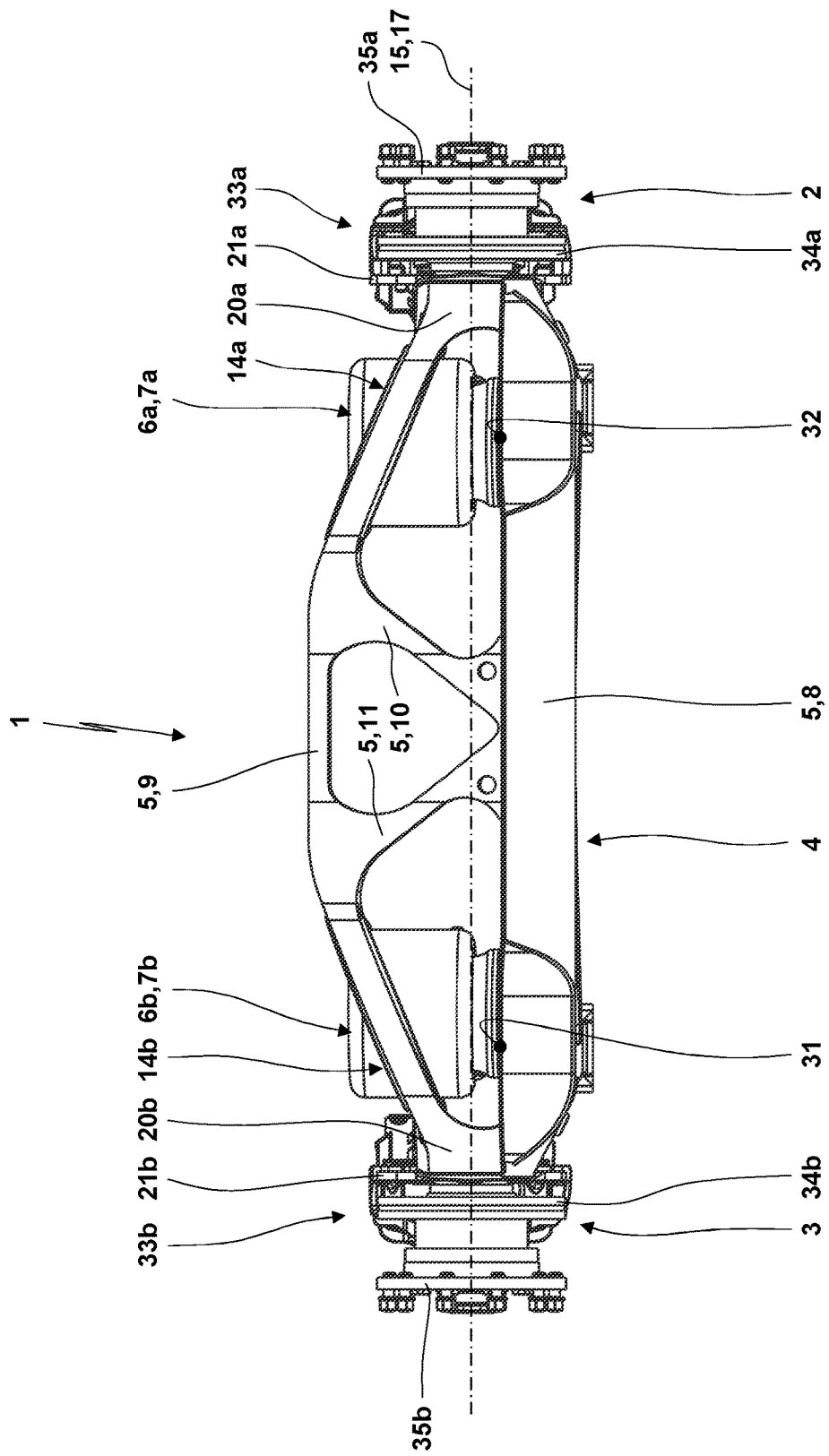
FIG. 3 shows the commercial vehicle running gear according to FIGS. 1 and 2 in a rear view.

In the following description of the figures partially the same reference numeral is used for the same constructional elements. In this case, different constructional elements are denoted with a, b. If in such a case only a reference numeral is used, the description may apply to all of the constructional elements which have this reference numeral and are denoted with the additional letter a, b.

Figure 4:
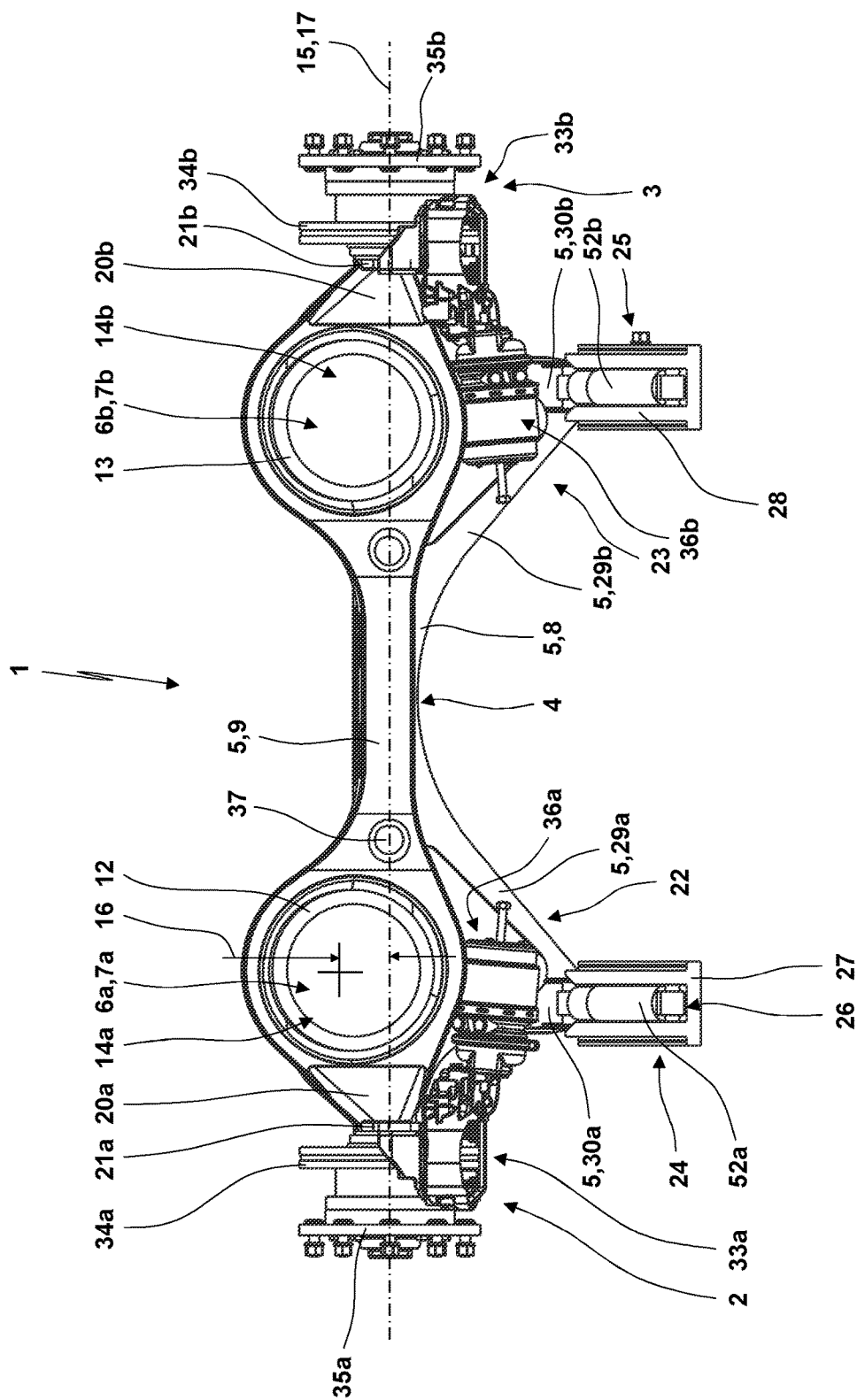
FIG. 4 shows the commercial vehicle running gear according to FIGS. 1 to 3 in a plan view.
Figure 5:
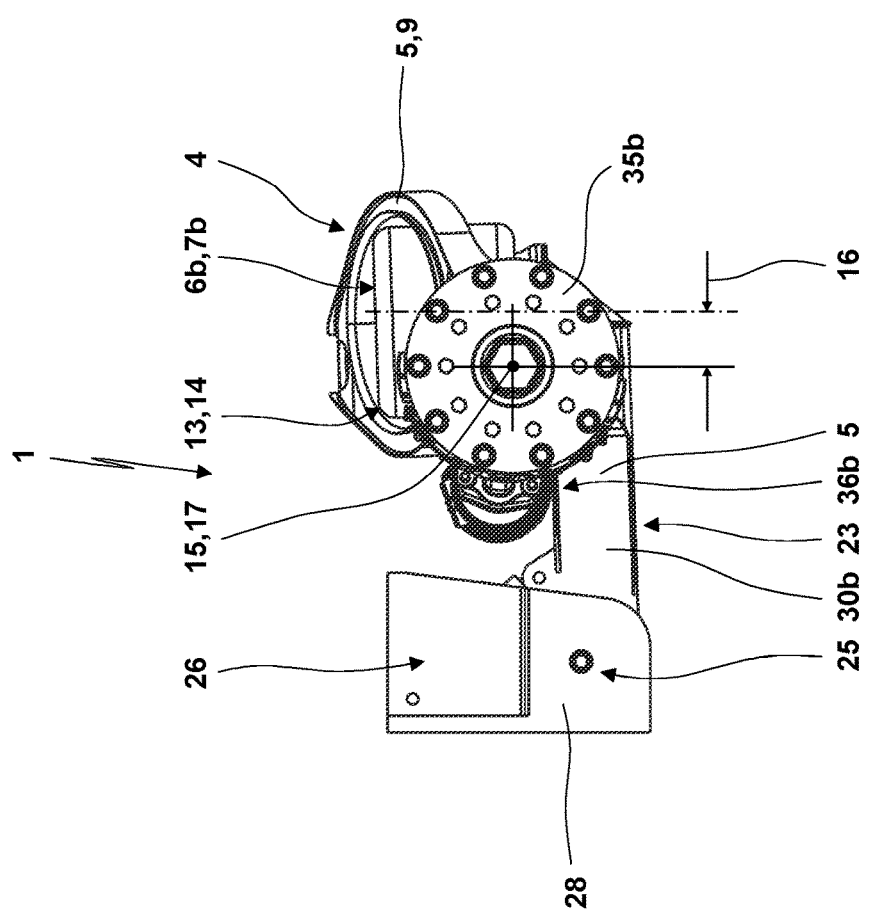
FIG. 5 shows the commercial vehicle running gear according to FIGS. 1 to 4 in a side view.
Figure 6:
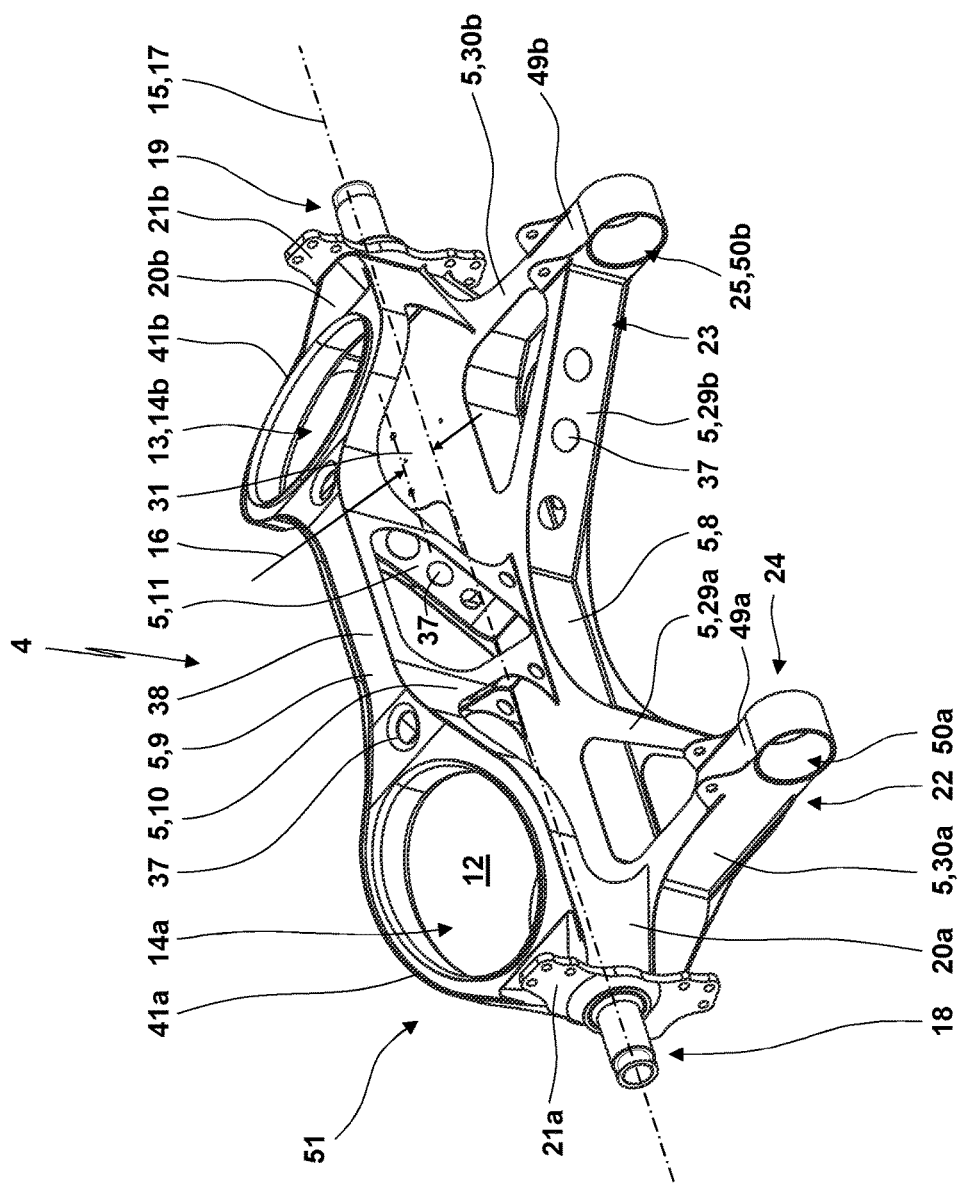
FIGS. 6 to 10 show a running gear structure of a commercial vehicle running gear according to FIGS. 1 to 5 in views corresponding to the views of FIGS. 1 to 5.
Figure 7:
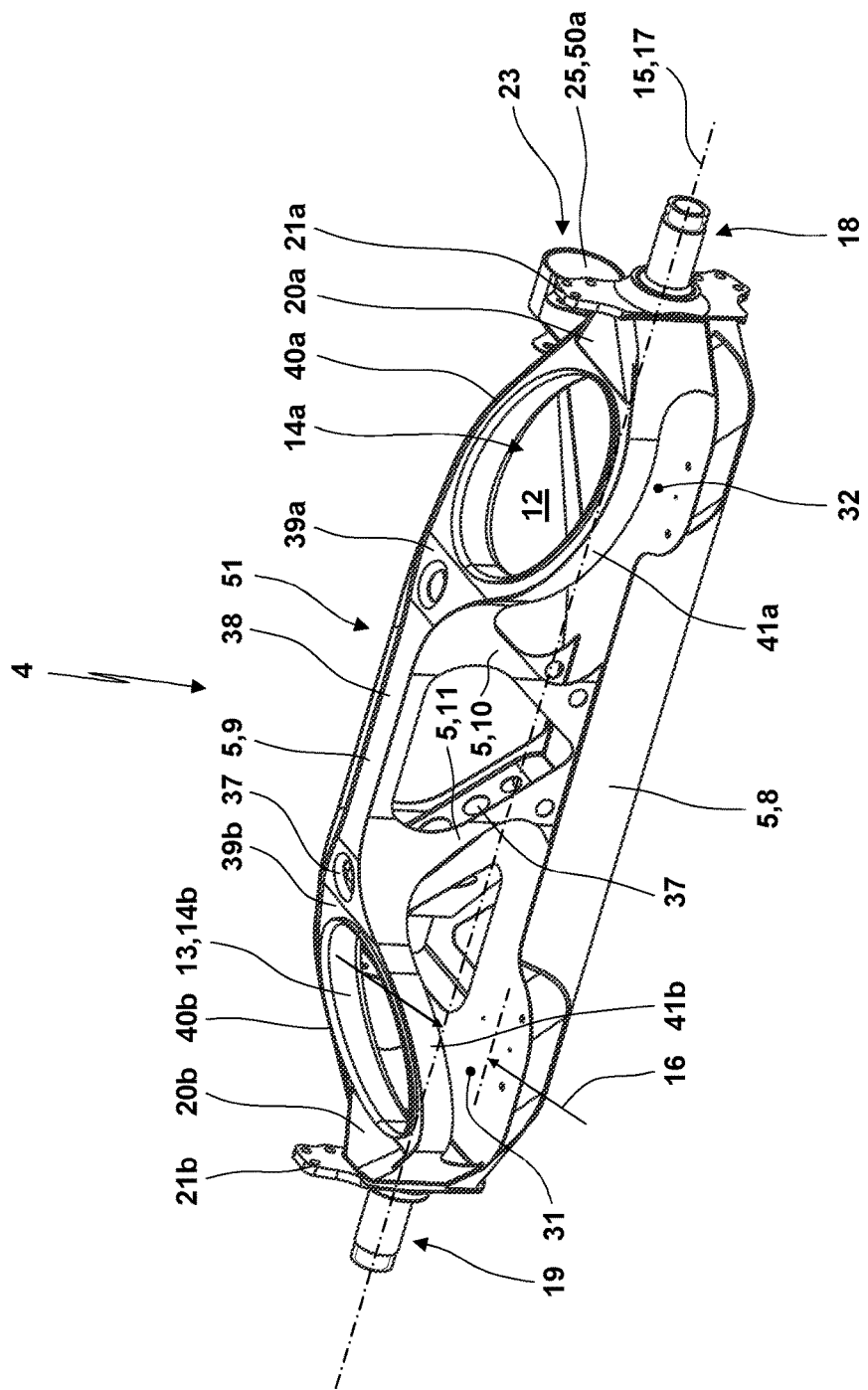

In the inventive commercial vehicle running gear 1 the connections between the left and the right wheel (here not shown) and the wheel suspension locations 2, 3 are provided by a running gear structure 4 for a commercial vehicle comprising a plurality of struts 5a, 5b, 5c, . . . connected to each other. The struts 5a, 5b, 5c, . . . in a skeletal way surround the suspension springs 6, here air suspension bellows 7. The running gear structure 4 comprises at least one lower transverse strut, at least one upper transverse strut and at least one diagonal strut. In preferred embodiments the running gear structure 4 comprises exactly one lower transverse strut 8 and exactly one upper transverse strut 9 and/or at least two diagonal struts 10, 11. In the regions close to the wheel suspension locations 2, 3 the upper transverse strut 9 of the running gear structure 4 comprises recesses 12, 13. By the provision of these recesses 12, 13 it is provided that above the lower transverse strut 8 in the regions close to the suspension locations 2, 3 a space or suspension spring accommodation 14 is formed. The space 14 is at least open in upper direction and suitable for accommodating the suspension spring. In a preferred embodiment the upper transverse strut 9 has a design such that the upper transverse strut has the shape shown in the plan view of FIG. 4. Here, in a cross section the recess 12, 13 has a shape having a closed edge which is e.g. elliptically, circular or at least approximately circular. The upper transverse strut 9 completely surrounds the recess 12, 13. The shape of the recess 12, 13 in the plan view preferably does not have any edge. For an alternative embodiment, the recess 12, 13 might also have an open edge in the cross section, wherein the cross section is in particular open on one side. The recess 12, 13 can be positioned with an offset 16 to a connecting line 15 of the wheel suspension locations 2, 3 as can in particular be taken from FIG. 4. The connecting line 15 of the wheel suspension locations 2, 3 intersects or crosses the space 14 of the running gear structure 4 which is formed above the lower transverse strut 8 by the recess 12, 13 and which is open in upper direction. In the inventive commercial vehicle running gear 1 the suspension springs 6 are placed in the recesses 12, 13 provided by the running gear structure 4. In the side view the suspension springs 6 are located approximately on a vertical line through the wheel supporting locations. The suspension springs 6 are crossed by the middle lines 17 of the stud axles 18, 19. The lower transverse strut 8 extends below the suspension springs 6 and the upper transverse strut 9 surrounds the suspension spring 6. In the middle sections both transverse struts 8, 9 are connected by diagonal struts. In their ends the diagonal struts 10, 11 are connected to each other by a connecting piece 20 which preferably integrates a brake flange 21 and a stud axle

18, 19. In the front section of the commercial vehicle running gear 1 the longitudinal swinging arms 22, 23 extend from the lower transverse strut 8 to the rotational joints 24, 25. In the rotational joints 24, 25 the commercial vehicle running gear 1 is supported at the vehicle chassis 26 (here brackets 27, 28 of the vehicle chassis 26) for being pivoted. The longitudinal swinging arms 22, 23 have a triangular shape and comprise an inner strut 29 and an outer strut 30. In the rear section the lower transverse strut 8 forms preferably two spring supports 31, 32 which serve for mounting and/or supporting the suspension springs 6.

A brake device 33 comprising a brake caliper is held by the brake flange 21. A brake disc 34 of the brake device 33 and a wheel flange 35 at which a vehicle wheel is fixed are held on the stud axle 18, 19. The brake device 33 can be actuated by a brake actuator 36 which might be a hydraulical, pneumatic or electric brake actuator. As shown, the brake actuator 36 can be supported by a holding device of the running gear structure 4. For the shown embodiment, the holding device is formed by the lower transverse strut 8. Preferably, the brake actuator 36 is supported on the upper side of the lower transverse strut 8 which is the case at a location between the suspension spring 6 and the rotational joint 24, 25 in a plan view when seen in longitudinal direction.

In the FIGS. 6 to 12 the running gear structure 4 is shown in a plurality of views as a single component with the stud axles 18, 19 and the connecting pieces 20.

The struts 5 of the running gear structure 4 are embodied as double-T carriers. Here, the vertical leg of the double-T for the upper transverse strut 9 and the diagonal struts 10, 11 has an horizontal orientation, whereas the horizontal legs of the double-T for the upper transverse strut 9 and the diagonal struts 10, 11 are arranged in vertical planes. Instead, for the struts 29, 30 the vertical legs of the double-T are arranged in vertical planes, whereas the horizontal leg of the double-T is arranged in a horizontal planes. The lower transverse strut 8 is in some cases also formed by a double-T carrier. However, preferably the lower transverse strut 8 is formed by a hollow profile or a box profile. The double-T carrier and the hollow profile or box profile are each manufactured preferably from metal sheets which are tailor-cut by a laser and form the walls or for the vertical and horizontal legs. It is possible that the metal sheets are brought into the required shape before their welding so that these have the curvatures shown in the figures.

As can be seen in the figures, the upper side and/or the lower side of the lower transverse strut 8 as well as of the inner strut 29 and the outer strut 30 are/is completely, at least partially or at least in the transitional region from the lower transverse strut 8 to the struts 29, 30 made of a single, continuous metal sheet which is flat here. In a corresponding way, the front face and/or the rear face of the upper transverse strut 9 as well as of the diagonal struts 10, 11 are completely, at least partially or at least in the transitional region from the upper transverse strut 9 to the diagonal struts 10, 11 made from a single, continuous metal sheet which is here curved in the region of the recesses 12, 13. In the transitional regions between the diagonal struts 10, 11 and the upper transverse strut 9, the horizontal legs of the double-T comprise curved extensions so that they have a larger extension in these transitional regions and they are able to provide a transfer of tensions without stress peaks. The corresponding applies for the horizontal legs of the double-T in the transitional regions between the lower transverse strut 8 and the struts 29, 30.

In order to achieve a reduction of weight, the vertical legs of the double-T can be provided with recesses. Due to the fact that the recesses may extend in the neighborhood of the neutral fiber of the double-T carrier, the recesses do not lead to a significant reduction of the geometric moment of inertia.

Preferably, the running gear structure 4 is formed with at least ten metal sheets welded to each other for providing the struts 5. Here, the metal sheets are welded partially or completed by use of fillet welds. It is possible that only or partially metal sheets having a sheet thickness of less than 5 mm (in particular less than 4 mm or 3.5 mm or even 3 mm) are used.

The upper transverse strut 9 comprises a center piece 38 having an orientation in horizontal direction and having a straight longitudinal axis. By angular offsets 39a, 39b the upper transverse strut 9 transits from the center piece 38 in outer direction into angled end regions 40a, 40b which here also comprise a straight longitudinal axis. The length of the end regions 40a, 40b corresponds to the length of the center piece 38. However, also deviations of plus/minus 30% (in particular plus/minus 20% or plus/minus 10%) are possible. The inclination of the longitudinal axes of the end regions 40a, 40b relative to the center piece 38 is in the range of 10° to 50° (in particular 15° to 40° or 20° to 30°). With increasing distance of the end regions 40a, 40b from the center piece 38, the distance of the same from the lower transverse strut 8 decreases.

The recesses 12, 13 are arranged approximately in the middle of the end regions 40a, 40b when seen in the longitudinal direction of the same. The end regions 40a, 40b form rings 41a, 41b which limit the recesses 12, 13 and protrusions 42, 43 being arranged coaxially to each other. The protrusion 42 is here connected to the center piece 38, whereas the protrusion 43 is connected to the connecting piece 20. The rings 41a, 41b comprise a generally constant cross section. However, in order to avoid stress peaks the rings 41a, 41b transit via rounded and increased cross sections on the one hand into the center piece 38 and on the other hand into the connecting piece 20.

The diagonal struts 10, 11 are arranged in a V-shape. The connecting region of the two legs of the V is arranged in the middle of the upper side of the lower transverse strut 8. Here, the diagonal struts 10, 11 are arranged directly adjacent to each other. In the connecting region, the horizontal leg of the double-T comprises an increased extension so that a connection of the diagonal struts 10, 11 to the lower transverse strut 8 is provided with a large connecting area. From this connecting region the legs of the V extend towards the angular offsets 39a, 39b. The end regions of the legs facing away from the connecting region merge into the angular offsets 39a, 39b. Here, the diagonal struts 10, 11 comprise a straight longitudinal axis. The opening angle of the V is in the range of 50° to 90° (in particular 60° to 85° or 65° to 80°).

The connection of the upper transverse strut 9, here of the protrusions 43, to the end regions of the lower transverse strut 8 is provided by the connecting pieces 20a, 20b. The connecting pieces 20 are preferably manufactured by metal forming. The connecting pieces 20 are welded to the protrusions 43 and to the end regions of the lower transverse strut 8. The connecting pieces 20 comprise a recess or bore wherein the stud axles 18, 19 are housed under establishment of a fit. Furthermore, the connecting pieces 20 comprise a fixation region for the associated brake flange 21 which can be screwed and/or welded to the connecting piece 20. It is possible that the stud axle 18, 19 is additionally or alternatively to the fit welded to the brake flange 21 and/or the associated connecting piece 20.

In a horizontal plane, in the longitudinal swinging arms 22, 23 the struts 30 form an angle in the region of 70° to 110° (in particular in the region of 80° to 100° or 85° to 95°) relative to the connecting line 15. Here, the struts 29*a*, 29*b* form a V with an opening angle in the region of 70° to 110° (in particular in the region of 80° to 100° or 85° to 95°). The struts 29*a*, 29*b* are fixed to the lower transverse strut 8 approximately in the region of the longitudinal extension of the lower transverse strut 8 which is located vertical below the angular offsets 39*a*, 39*b*. In their end regions the struts 29*a*, 29*b* are connected to the struts 30. The struts 30 protrude with the protrusions 49*a*, 49*b* from the connecting region. In the region of the protrusions 49*a*, 49*b*, the struts 30 form bearing lugs 50*a*, 50*b* of the rotational joints 24, 25.

The running gear structure 4 comprises two structure parts 44, 45.

Figure 8:
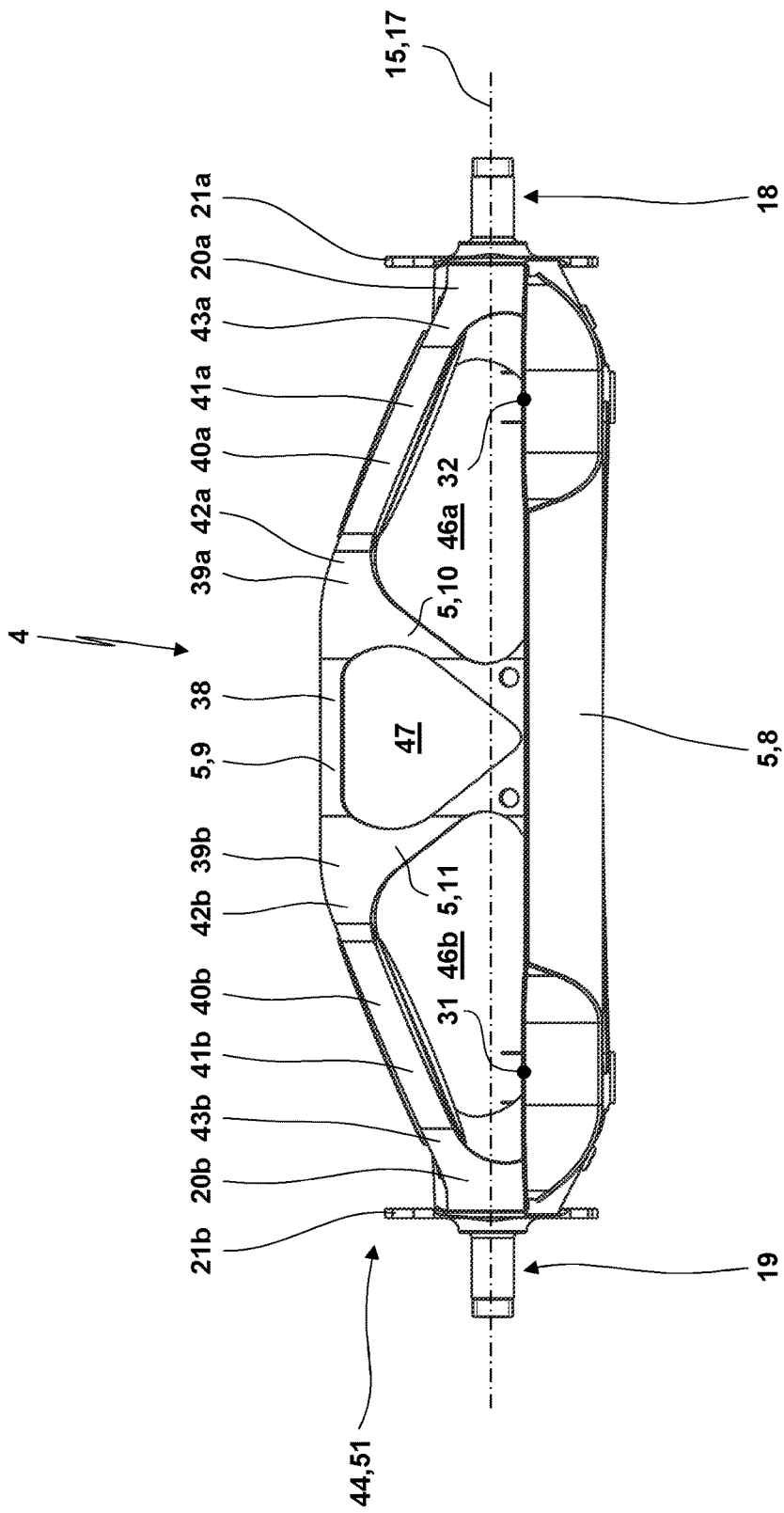

The structure part 44 extends in a vertical plane (cp. FIG. 8). The structure part 44 is formed with the upper transverse strut 9, a part of the connecting piece 20, the lower transverse strut 8 and the diagonal struts 10, 11 which form a two-dimensional "truss" or "framework" with outer intermediate spaces 46*a*, 46*b* which are limited by the connecting piece 20, an end region 40*a*, 40*b*, a diagonal strut 10, 11 and a part of the lower transverse strut 8 and a centered intermediate space 47 which is limited by the diagonal struts 10, 11 and the center piece 38 of the upper transverse strut 9. In the region of the rings 41 defining the recesses 12, 13, the structure part 44 comprises a larger extension in a direction transverse to the vertical plane spanned by the structure part 44. The structure part 44 forms the axle body 51.

Figure 9:
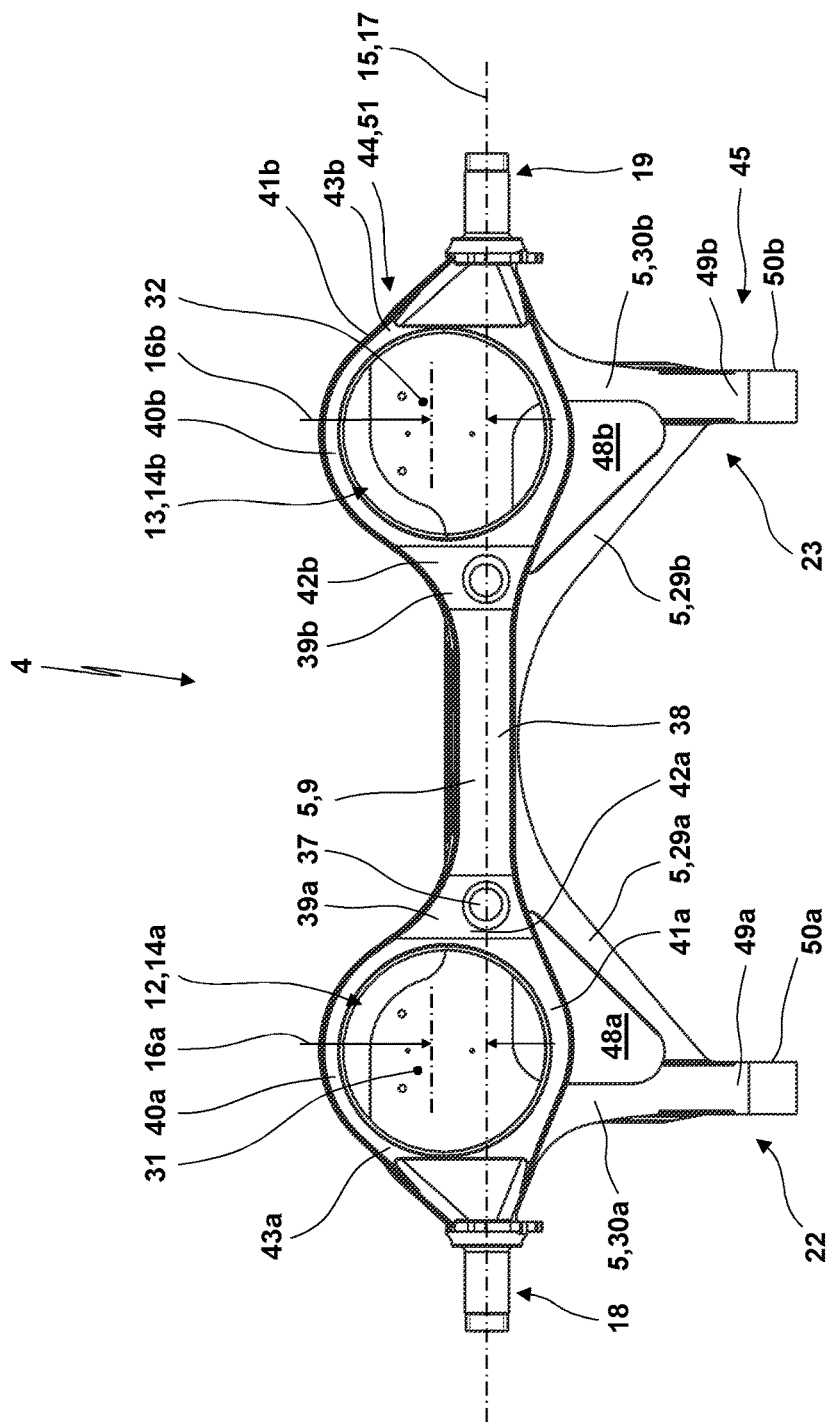
Figure 10:
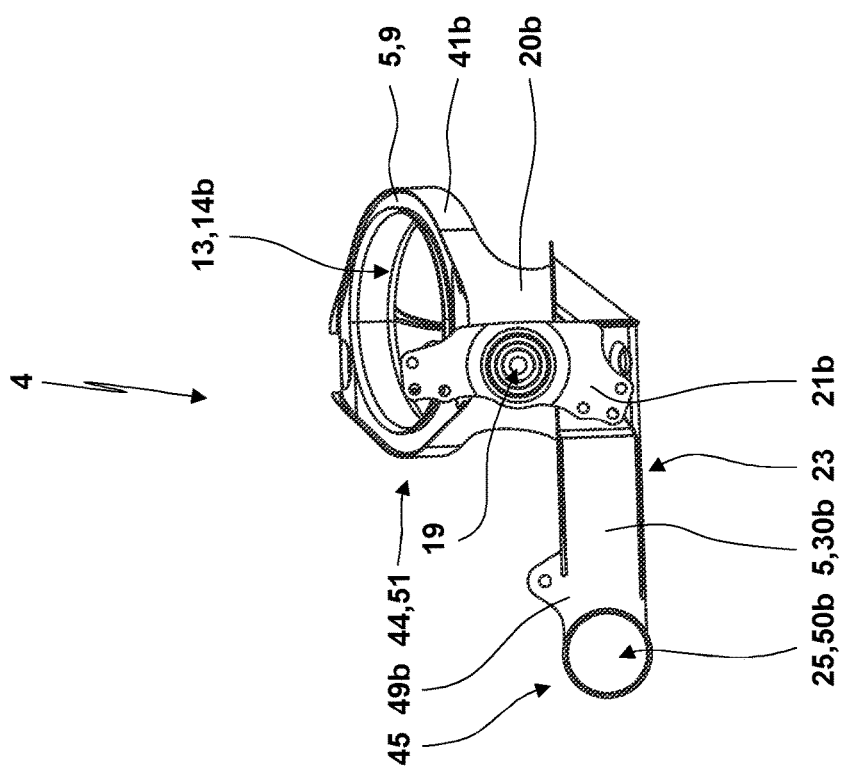
Figure 11:
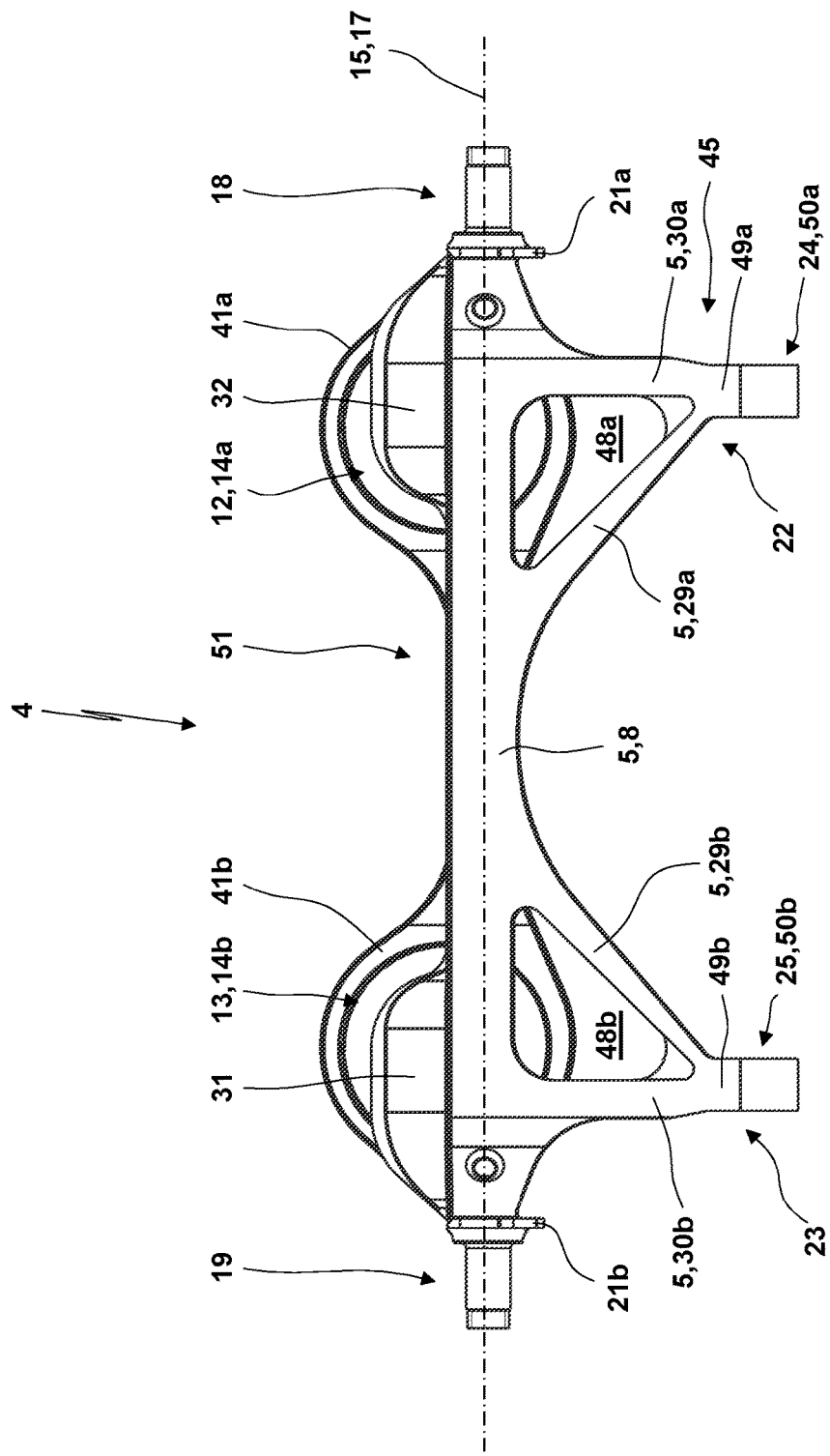
FIG. 11 shows the running gear structure according to FIGS. 6 to 10 in a view from below.
Figure 12:
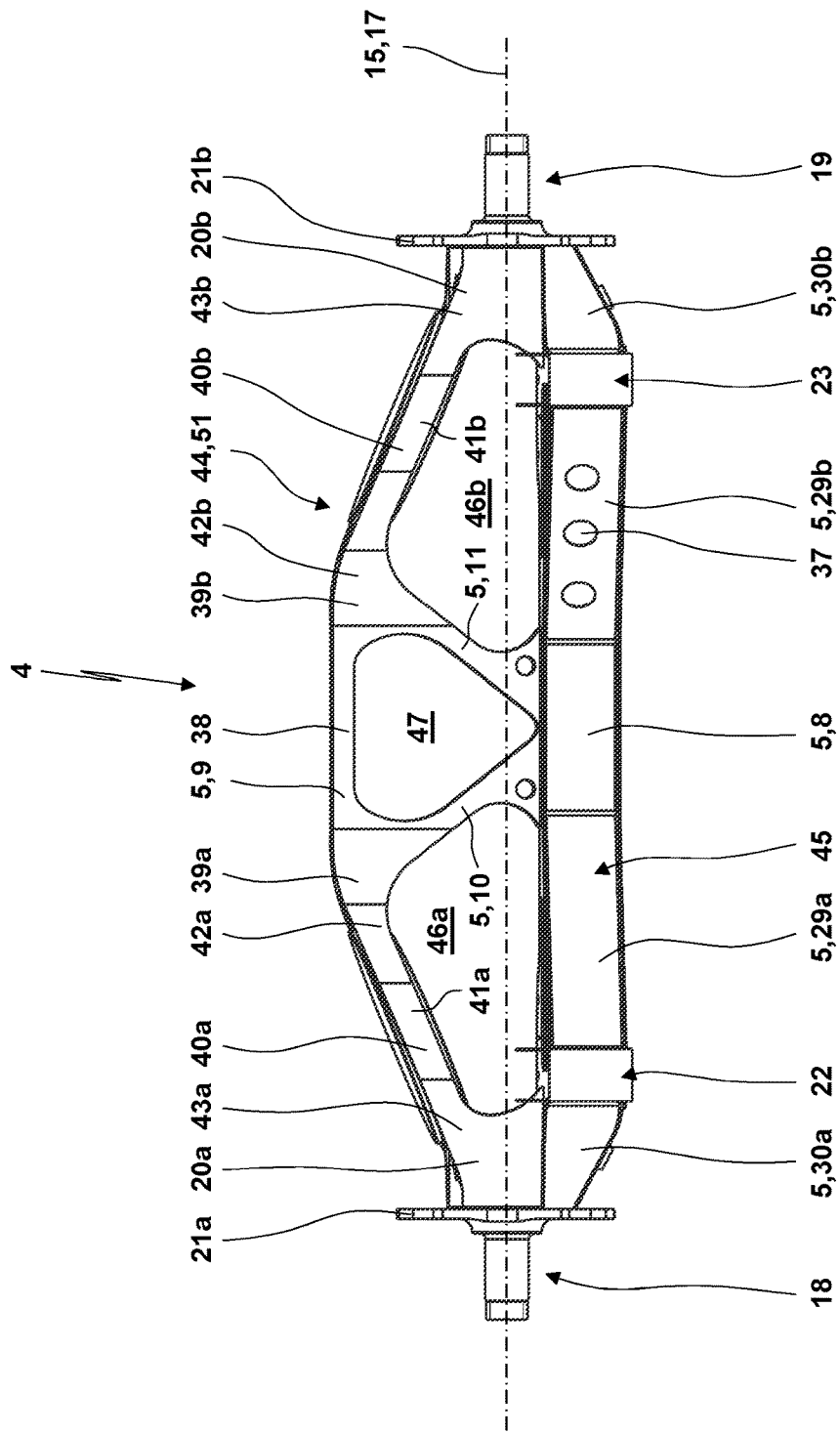
FIG. 12 shows the running gear structure according to FIGS. 6 to 10 in a view from the front.

The structure part 45 extends in a horizontal plane (cp. FIGS. 9, 11). The structure part 45 is formed by the lower transverse strut 8 and the two struts 29, 30, which also span a two-dimensional "framework" or "truss" with intermediate spaces 48*a*, 48*b* in the region of the longitudinal swinging arms 22, 23. The intermediate spaces 48*a*, 48*b* are limited by the end region of the lower transverse strut and the associated struts 29, 30.

The two structure parts 44, 45 are connected to each other by the common lower transverse strut 8 to the running gear structure 4. An L-shaped, angled running gear structure 4 results. Here, the vertical leg of the L is formed by the structure part 44 whereas the horizontal leg of the L is formed by the structure part 45.

The running gear structure 4 is preferably completely or partially made of metal, in particular steel. It is possible that any constructional steel or structural is used, as e.g. fine grain structural steel of the type S460 or the like. However, it is also possible that the running gear structure 4 is completely or partially made of any other material. So, it is possible that the running gear structure 4 is made of a composite material or a fiber-composite material, e.g. an aluminum composite material, a graphite composite material or carbon fibers which are embedded into a matrix of a suitable material (e.g. a plastic material, in particular a duromeric or thermoset plastic material or a thermoplastic plastic material). Here, the cross sections of the struts 5 can differ from the shown and described cross sections in dependence on the used material and the used manufacturing process. However, preferably still the base concept of the running gear structure 4 with the structure parts 44, 45 and the single mentioned struts 5 will be used. The stud axles 18, 19 are preferably forged pieces.

A pivoting of the longitudinal swinging arms 22, 23 leads to a bias of the suspension dampers 52*a*, 52*b* which are linked to the longitudinal swinging arm 22, 23 and to the brackets 27, 28 at locations remote from the rotational joints 24, 25.

It is possible that the rotational axes of the rotational joints 24, 25 in the direction of the longitudinal axis of the commercial vehicle have a distance in the region of 450 mm to 650 mm from the connecting line 15, whereas the offset 16 of the central axis of the suspension spring 6 from the connecting line 15 is between 70 mm and 90 mm, or have a distance in the region of 500 mm to 600 mm from the connecting line 15, whereas the offset 16 of the central axis of the suspension spring 6 from the connecting line 15 is between 75 mm and 85 mm.

However, it is also possible that the offset 16 is approximately zero so that the component of the wheel load which is transferred by the rotational joints 24, 25 is minimized. With an increase of the offset 16, the bias of the suspension spring 6 is reduced so that for a given maximum support load of the suspension spring 6 by the choice of the offset 16 the bias of the suspension spring 6 can be changed. With an increase of the offset 16, it is possible to use a suspension spring 6 which might generally be dimensioned for smaller support loads.

Preferably, as a suspension spring 6 an air suspension bellow 7 is used which has an outer diameter of 360 mm. Accordingly, the recesses 12, 13 have a minimum cross section which is larger than a circular area having a diameter of 360 mm.

The here mentioned dimensions, materials and/or the design of the running gear structure 4 can preferably be used for a technical axle load of more than 7 t, in particular more than 7.5 t or even more than 8 t.

The inventive part of the concept to provide recesses 12, 13 of the upper transverse strut 9 in a running gear structure 4 by which above a lower transverse strut 8 a space at least open in upper direction and suitable for accommodating the suspension spring 6 is formed is not limited to the embodiment of the commercial vehicle running gear shown here. To mention only one example, it is not necessarily required that here the running gear structure 4 is only guided by a right and a left longitudinal swinging arm 22, 23. Instead, on both sides of the vehicle the vehicle wheel can be guided by a rhomboid guidance with an upper longitudinal swinging arm and a lower longitudinal swinging arm. Also in this case a space of the running gear structure 4 being open in upper direction can be used for accommodating the suspension spring 6. Alternatively or additionally, it is possible that in a running gear structure 4 there is not only one suspension spring 6 associated with one vehicle side, but at least two suspension springs are associated to the vehicle side which are then e.g. arranged one behind another when seen in longitudinal direction of the vehicle. In this case, both suspension springs located one behind the other can each be arranged in a space being open in upward direction in a recess of an upper transverse strut of the running gear structure 4.

The running gear structure 4 has a considerable lower weight and lower costs than the prior art running gear structures with at the same time improved suspension characteristics. The running gear structure 4 opens constructional space for the accommodation of electric motors close to the wheel hub. These advantages result from the following:

The reduction of weight generally bases upon the fact that the longitudinal swinging arms 22, 23 and the axle body 51 of the commercial vehicle running gear 1 have a lower weight than the prior art.

The reduction of the weight of the longitudinal swinging arms 22, 23 results from the direct introduction of the force of the wheel load into the suspension springs 6. This is due to the fact that the suspension springs 6 can be positioned in a side view approximately directly on the vertical line above the wheel supporting location. This reduces the length of the load path leading from the wheel supporting location to the suspension spring 6. The longitudinal swinging arms 22, 23 approximately do not have to transfer any vertical load. The longitudinal swinging arms 22, 23 are in the case of a vertical load free from bending moments so that they may have comparatively thin walls and can have light dimensions. In order to increase the capability of transferring lateral forces introduced during curve drive, the longitudinal swinging arms 22, 23 have a triangular design with the inner and outer struts 29, 30 so that these mainly transfer tensile forces or compressive forces.

The saving of weight in a center section of the commercial vehicle running gear, in particular of the axle body 51, is achieved because instead of the common axle body 51 a thin walled supporting structure is used. The proposed arrangement allows to reduce the wall thickness of the struts 5 to 3 mm because the struts 5 are mainly biased by tensile and compressing forces and by a much smaller bending moment. For a vertical load introduction the upper transverse strut 9 mainly transfers compressive forces whereas the lower transverse strut 8 mainly transfers tensile forces. The material utilization of the tensile struts and compressive struts is higher than that of common axle bodies because the compressive and tensile stresses are distributed more homogeneously in the cross sectional areas. In contrast thereto, common axle bodies 51 are mainly biased by bending moments where only the outer fibers are biased to the maximum whereas the remaining inner material is not completely biased.

The weight advantage of the support structure can be seen in the fact that the support structure provides a lot of more options for the geometric design as common constructions. The geometry of the commercial vehicle running gear 1 might follow the force flow so that the stresses are homogeneously distributed in the struts 5. In this way, it is possible to avoid notch stress peaks as well as excess material accumulations.

In contrast thereto, common constructions consist of comparatively simple semi-manufactured profiles as square profiles or tubes which provide less design options to the designer and which have a constant cross section and constant wall thicknesses over the entire length. Common are e.g. axle tubes of the dimension 0127 mm×12 mm. Notch stress peaks in the area of the clamping of the longitudinal swinging arms are unavoidable for common constructions. The wall thickness of the axle body has to be dimensioned according to the highest stresses in the region of the clamping so that remote from the notches the components are often over-dimensioned and have a higher weight than required.

The reduction of weight when compared to the prior art is in the range of 40 to 70 kg dependent on the constructions compared. For commercial vehicle running gears presently on the market, the axle body, longitudinal swinging arms and supports for the air bellows have a weight between 145 kg and 175 kg. In contrast thereto, a comparable inventive construction has a weight of preferably less than 130 kg, in particular less than 125 kg, 120 kg, 115 kg, 110 kg, 105 kg or even 100 kg. The reduction of weight does not decrease the lifetime. Instead, the reduction of weight is only achieved by the light weight construction approach of the supporting structure.

With regard to the use of the commercial vehicle running gear 1 for electrically driven axles, the essential advantages result from the fact that in the running gear structure 4, in particular between the upper and lower transverse strut 8, 9, free spaces and intermediate spaces 46, 47, 48 are formed wherein e.g. electronic elements or wheel hub motors can be placed.

The economic benefit of the invention results from the reduced weight and has generally three reasons: At first, the reduction of weight correlates with the manufacturing costs because less material will be used for the manufacturing. This also applies under the applicable assumption that it is still possible to use a common constructional steel as e.g. fine grain structural steel of the type S460 or the like. Secondly, the economic benefit results from the fact that the admissible payload of the vehicle increases by the amount by which the empty weight of the vehicle decreases because the maximum of the overall vehicle weight is limited by law. So, a lighter commercial vehicle can be used for transporting more payload so that the costs of transportation will be reduced. Thirdly, in the marketing the empty vehicle weight has a significance for determining the price which has the consequence that a lighter vehicle is easier to sell.

Another advantage of the inventive design is the improved support characteristic of the proposed commercial vehicle running gear 1 due to the fact that the axle load is mainly inserted into the vehicle chassis 26 via the suspension spring 6. The longitudinal swinging arms 22, 23 and the rotational joints 24, 25 transfer only marginal loads. Accordingly, when driving on an uneven road, the axle load amplitudes biasing the vehicle chassis 26 and the payload are reduced.

In the present description, the structure part 44 is also denoted as "vertical structure part", whereas the structure part 45 is also denoted as "horizontal structure part". This also covers embodiments wherein the structure parts 44, 45 do not have an exact horizontal or vertical orientation when assembled in the commercial vehicle. Accordingly, the structure parts 44, 45 can also be arranged in a side view in an L-shape wherein the angle between the two legs of the L is not exactly 90° but is in the range between 80° and 110° (preferably between 85° and 95°). Also if there is a deviation from an angle of 90° of the two legs of the L or the structure parts 44, 45 do not have an exact horizontal or vertical orientation, the horizontal structure part 45 has an orientation such that the structure part 45 forms the longitudinal swinging arms 22, 23, whereas the vertical structure part 44 has an orientation such that the structure part 44 supports the wheel loads and provides a sufficient stiffness around a bending axis which has an orientation in the longitudinal direction of the vehicle.

Many variations and modifications may be made to the preferred embodiments of the invention without departing substantially from the spirit and principles of the invention. All such modifications and variations are intended to be included herein within the scope of the present invention, as defined by the following claims.

I claim:

1. Running gear structure for a commercial vehicle with a lower transverse strut and an upper transverse strut, said lower transverse strut and said upper transverse strut being fixedly connected to each other and said upper transverse strut comprising two recesses by which above the lower transverse strut a space is limited which is open at least in upper direction and which is dimensioned for accommodating a suspension spring, and wherein end regions of the upper transverse strut are angled downwards towards the lower transverse strut.

2. The running gear structure of claim 1, wherein the recesses of the upper transverse strut each comprise a distance from the lower transverse strut which is smaller than a longitudinal extension of the suspension spring.

3. The running gear structure of claim 1, wherein the running gear structure comprises wheel suspension locations and a connecting line of the wheel suspension locations crosses the space.

4. The running gear structure of claim 1, wherein the running gear structure comprises at least two diagonal struts.

5. The running gear structure of claim 1, wherein at both ends the upper transverse strut and the lower transverse strut are linked to each other by a connecting piece.

6. The running gear structure of claim 5, wherein at least one of a brake flange, and an axle trunnion is integrated into the connecting piece.

7. The running gear structure of claim 1, wherein the running gear structure comprises at least one of:
(a) a base body,
(b) a brake flange, and
(c) an axle trunnion being mounted to the base body.

8. The running gear structure of claim 1, wherein the running gear structure is designated for a technical axle load of at least 7000 kg and comprises a mass of less than 130 kg.

9. Running gear structure of claim 1, wherein the running gear structure forms an axle body and two longitudinal swinging arms.

10. The running gear structure of claim 9, wherein in a side view the running gear structure has an L-shape with a horizontal structure part forming the longitudinal swinging arms and a vertical structure part forming the axle body.

11. The running gear structure of claim 10, wherein the running gear structure has a skeletal design with a plurality of struts, said struts spanning a two-dimensional plane or a three-dimensional space.

12. The running gear structure of claim 11, wherein the struts comprise a double-T cross section and the struts are made of welded metal sheets.

13. The running gear structure of claim 9, wherein the longitudinal swinging arms each have a triangular shape and comprise an inner strut and an outer strut.

14. Commercial vehicle running gear comprising a running gear structure of claim 9, wherein suspension springs are arranged in the recesses.

15. The commercial vehicle running gear of claim 14, wherein the suspension springs are embodied as air suspension bellows.

16. The commercial vehicle running gear of claim 14, wherein in free areas or interspaces of the running gear structure at least one of electronics, an electric motor, a control unit, a valve device for manipulating the pneumatical bias of the suspension springs, and a brake actuator is arranged.

17. The running gear structure of claim 1, wherein the struts comprise a double-T cross section and the struts are made of welded metal sheets.

18. Commercial vehicle running gear comprising a running gear structure of claim 1, wherein suspension springs are arranged in the recesses.

19. The commercial vehicle running gear of claim 18, wherein the suspension springs are embodied as air suspension bellows.

20. The commercial vehicle running gear of claim 18, wherein in free areas or interspaces of the running gear structure at least one of electronics, an electric motor, a control unit, a valve device for manipulating the pneumatical bias of the suspension springs, and a brake actuator is arranged.

* * * * *